(12) United States Patent
Jun

(10) Patent No.: US 7,347,174 B2
(45) Date of Patent: Mar. 25, 2008

(54) COMBUSTION PROMOTING DEVICE FOR INTERNAL COMBUSTION ENGINE

(76) Inventor: Byoung Pyo Jun, Sungbok-dong, LG 1-Apartment 104-202, Sugi-Gu, Gyeonggi-do (KR)

( * ) Notice: Subject to any disclaimer, the term of this patent is extended or adjusted under 35 U.S.C. 154(b) by 0 days.

(21) Appl. No.: 11/499,000

(22) Filed: Aug. 4, 2006

(65) Prior Publication Data

US 2008/0000441 A1   Jan. 3, 2008

(51) Int. Cl.
*H01T 13/20* (2006.01)
*F02P 15/00* (2006.01)

(52) U.S. Cl. .................. 123/169 EL; 123/169 MG; 123/169 R; 313/118; 313/141

(58) Field of Classification Search ............ 123/143 B, 123/169 EL, 169 MG, 169 R; 313/118, 313/140, 141
See application file for complete search history.

(56) References Cited

U.S. PATENT DOCUMENTS

| 1,335,793 | A | * | 4/1920 | Olson ..................... 313/141 |
| 1,452,054 | A | * | 4/1923 | Propst ................. 123/169 EC |
| 2,028,896 | A | * | 1/1936 | Brinker .................. 123/169 C |
| 2,077,711 | A | * | 4/1937 | Redinger, Jr. ............... 313/141 |
| 4,206,381 | A | * | 6/1980 | Wax ......................... 313/141 |
| 4,983,877 | A | * | 1/1991 | Kashiwara et al. ......... 313/141 |
| 2005/0264151 | A1 | * | 12/2005 | Mori et al. ................. 313/141 |

* cited by examiner

*Primary Examiner*—T. M Argenbright
(74) *Attorney, Agent, or Firm*—Cantor Colburn LLP

(57) ABSTRACT

Disclosed is a combustion promoting device for an internal combustion engine which derives high combustion efficiency and high power from the internal combustion engine. The combustion promoting device is provided with a combustion promotion inductor formed of a super alloy having excellent heat resistance and thermal conductivity. The combustion promotion inductor is adapted to absorb high-temperature heat generated when an explosion stroke takes place. This absorption of the high-temperature heat allows the combustion promotion inductor to be maintained in a pre-heated state at all times, thereby serving as a kindler (a promoter generating a spark). As a result, the combustion promotion inductor rapidly increases the temperature of an air-fuel mixture introduced again after an exhaust stroke to reinforce the explosive force concomitant with the thermal expansion, thereby allowing the internal combustion engine to obtain high power.

6 Claims, 15 Drawing Sheets

[FIG. 1]
(Prior Art)
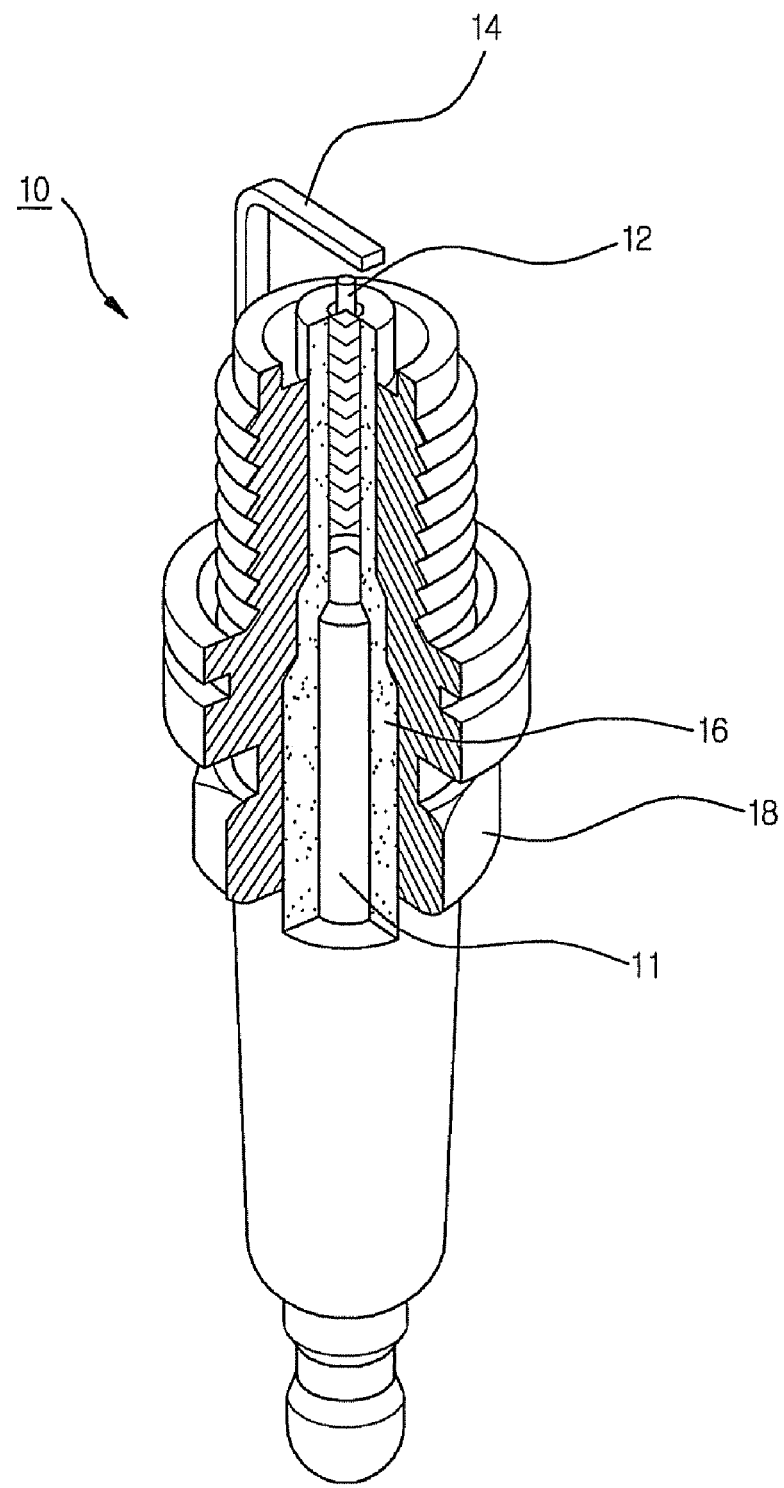

[FIG. 2]
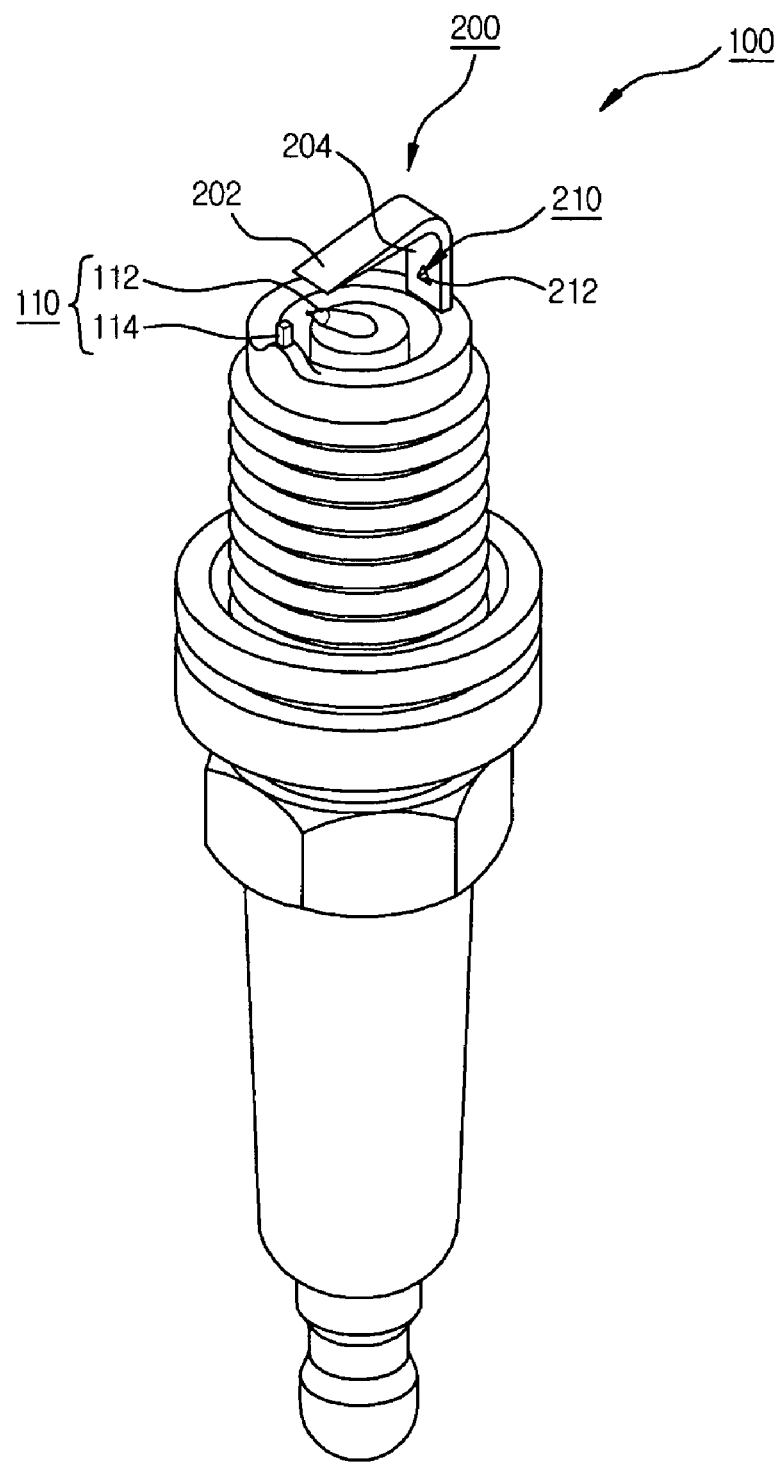

[FIG. 3]
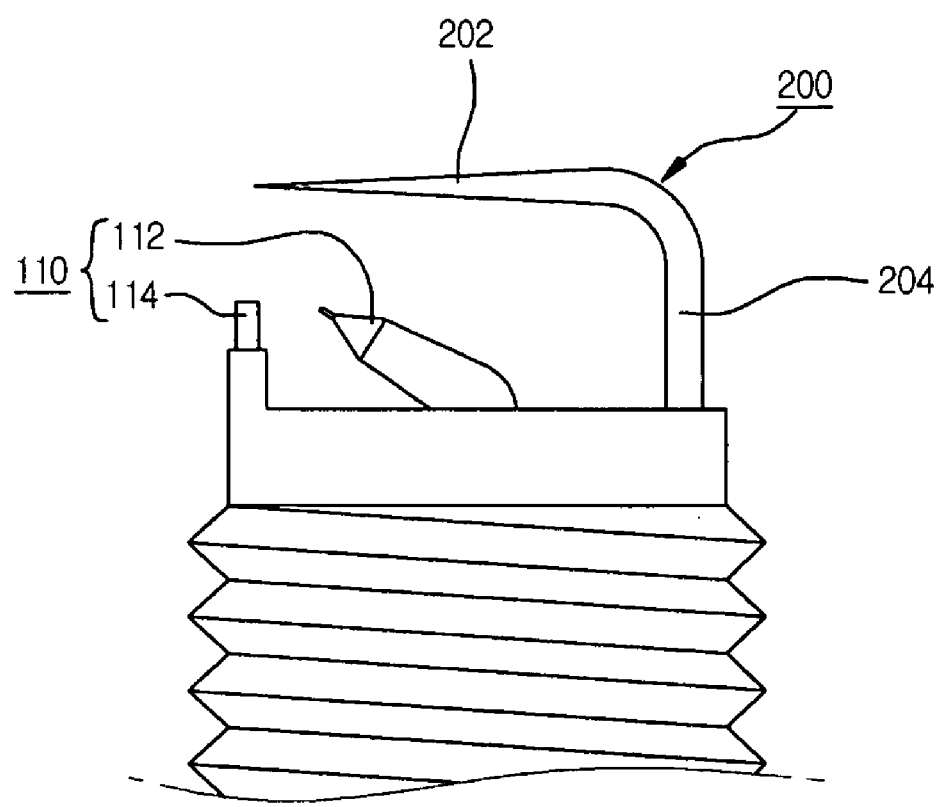

[FIG. 4]
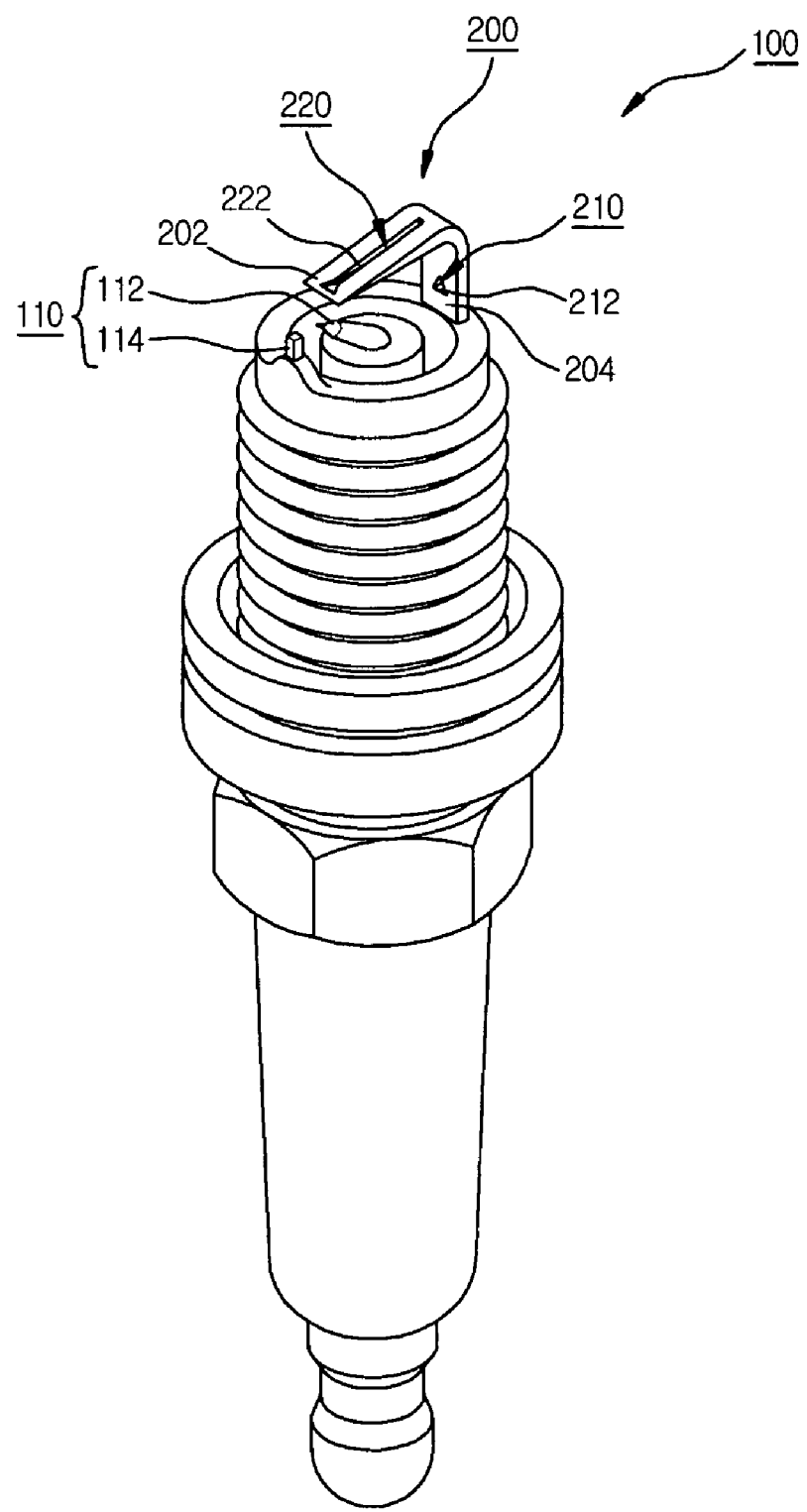

[FIG. 5]
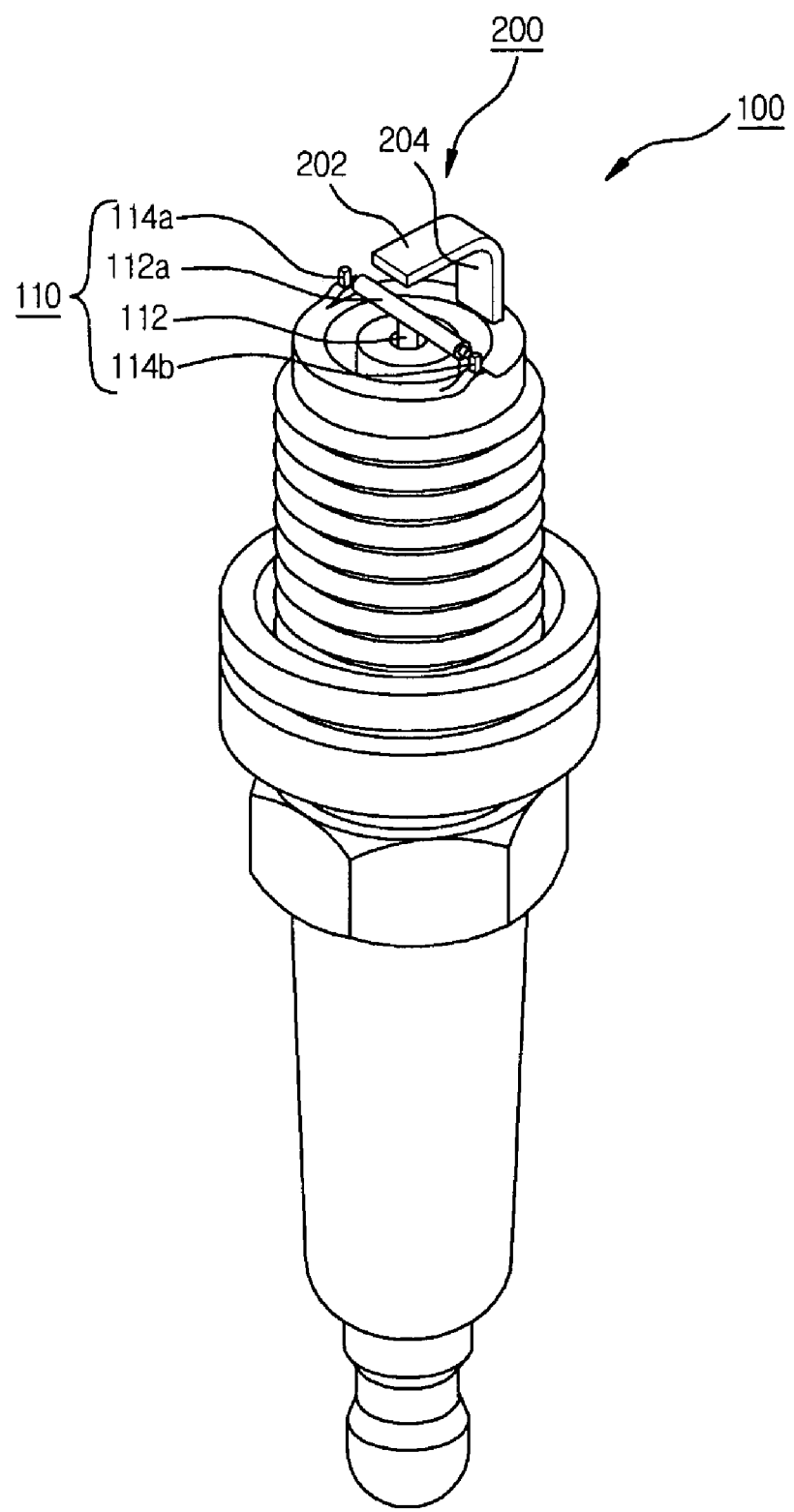

[FIG. 6]
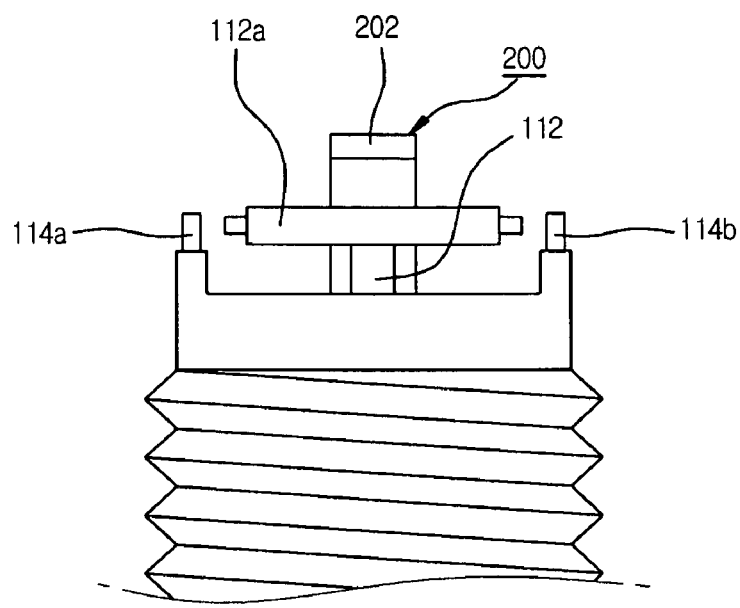
[FIG. 7]
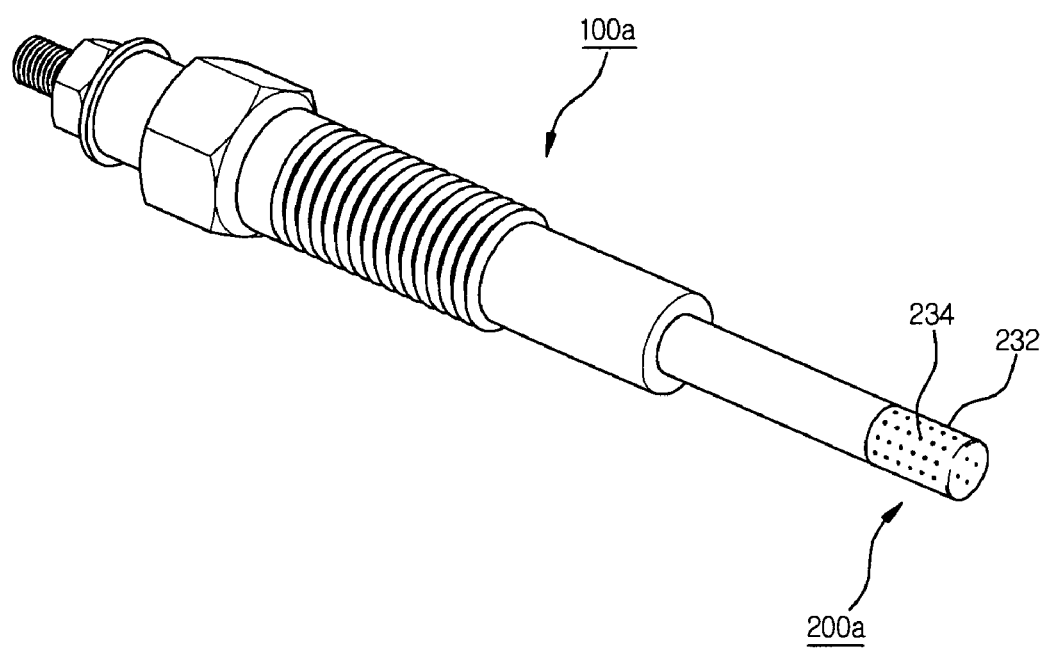

[FIG. 8]
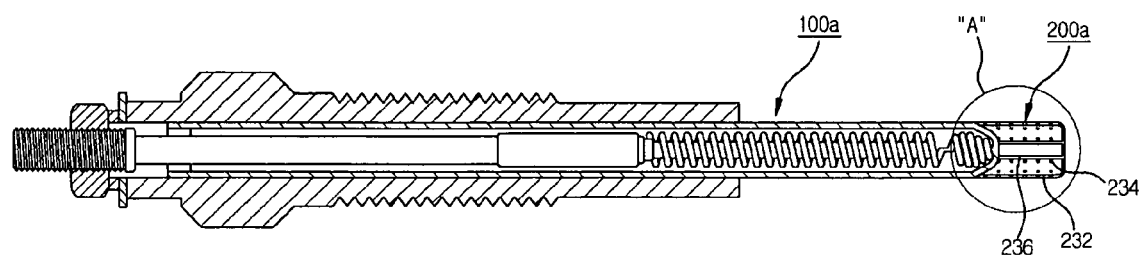
[FIG. 9]
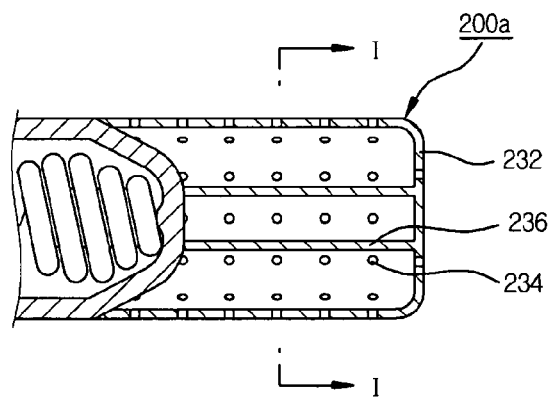
[FIG. 10]
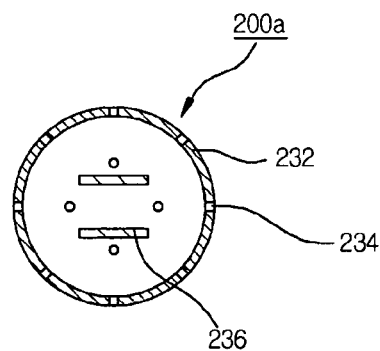

[FIG. 11]
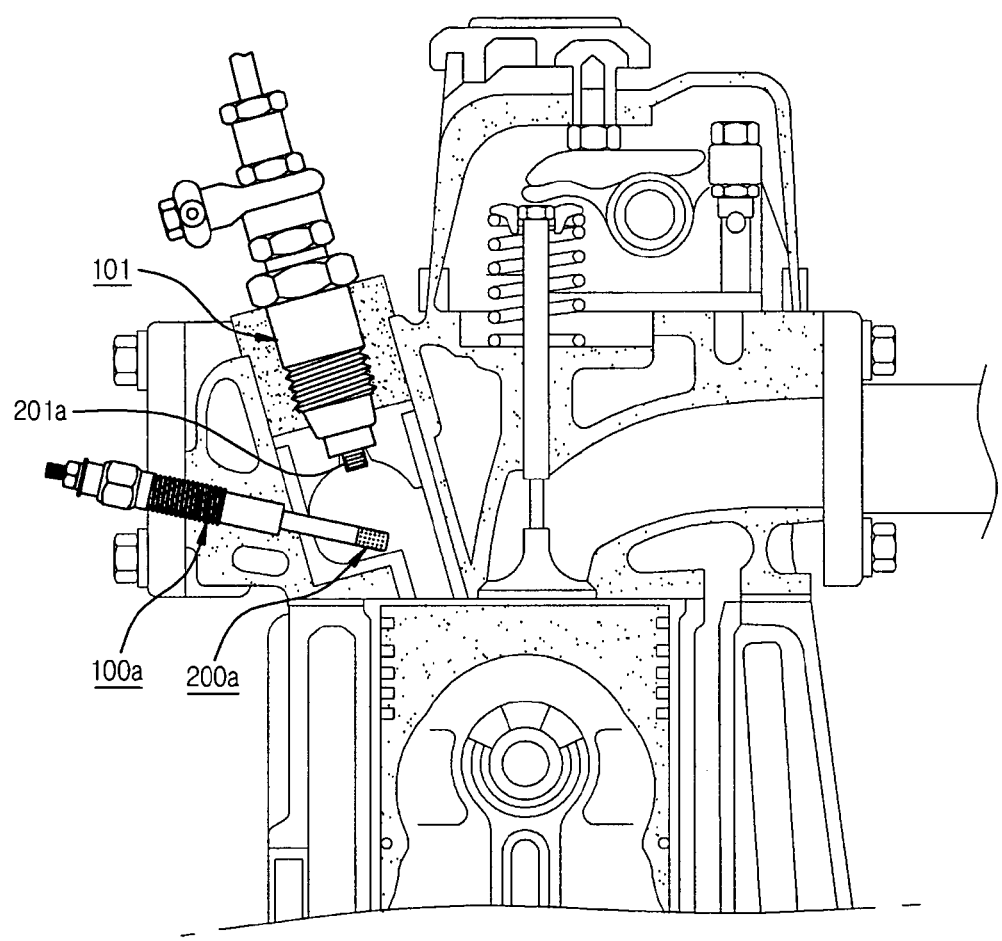

[FIG. 12]
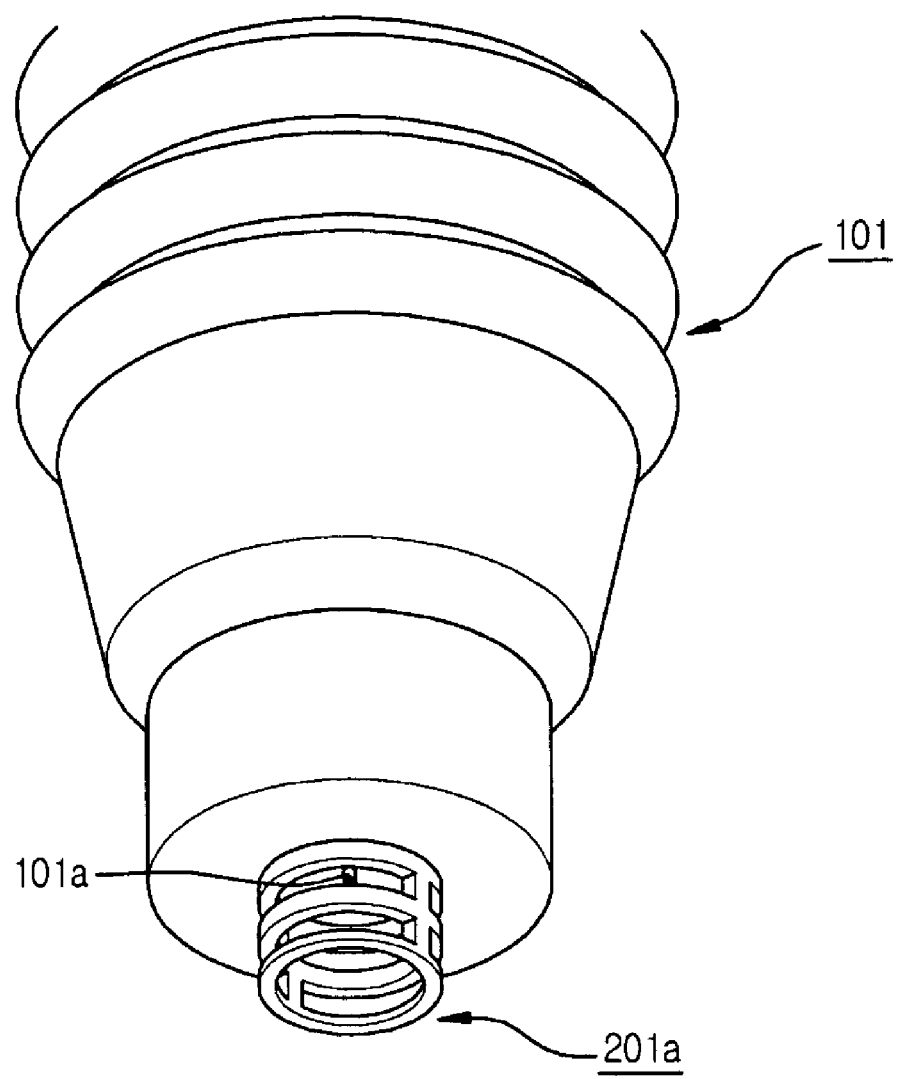

[FIG. 13]
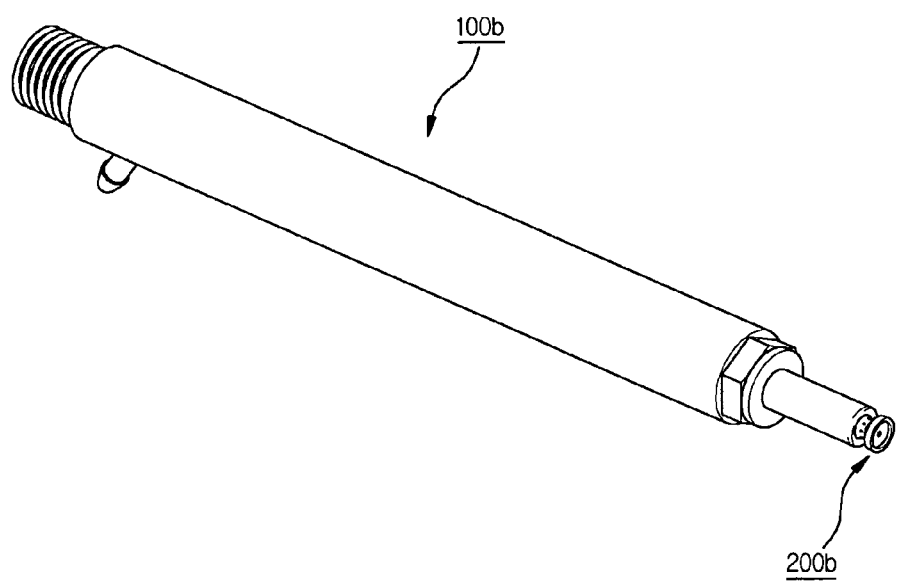
[FIG. 14]
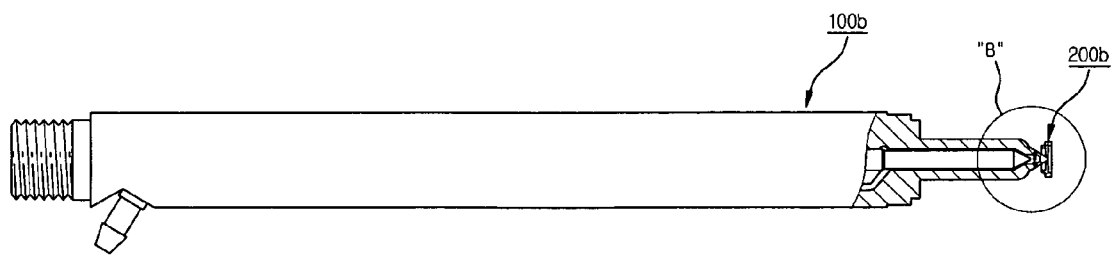

[FIG. 15]
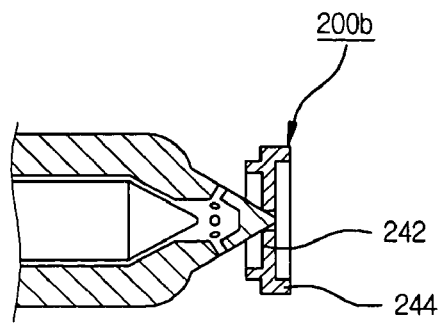
[FIG. 16]
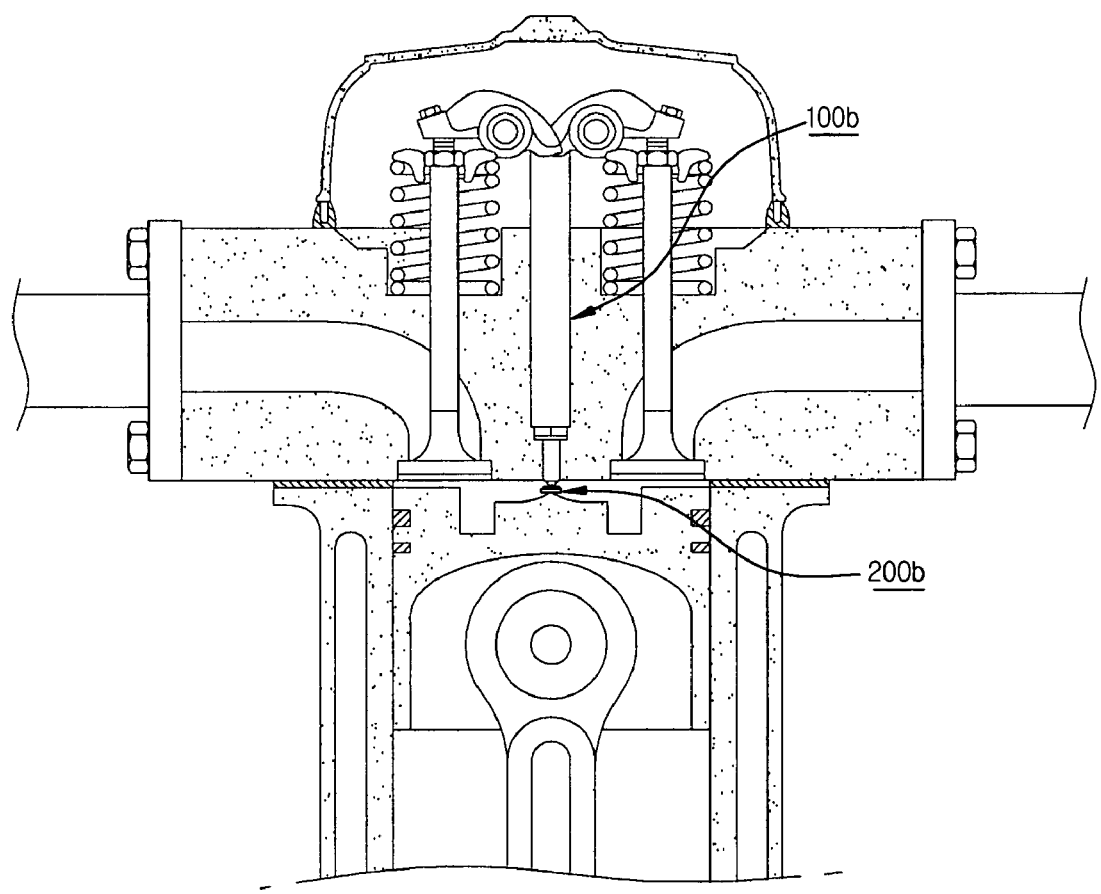

[FIG. 17]
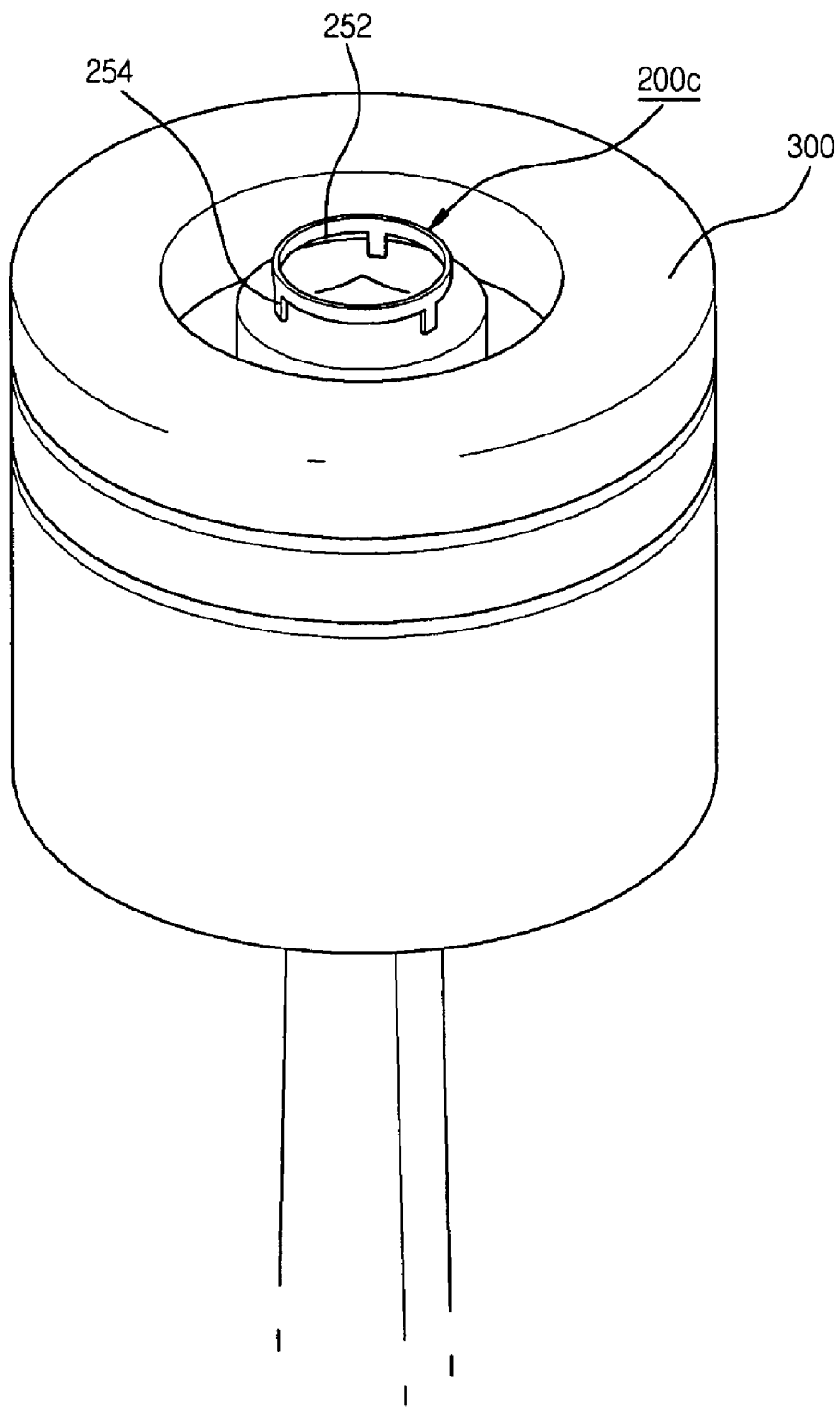

[FIG. 18]
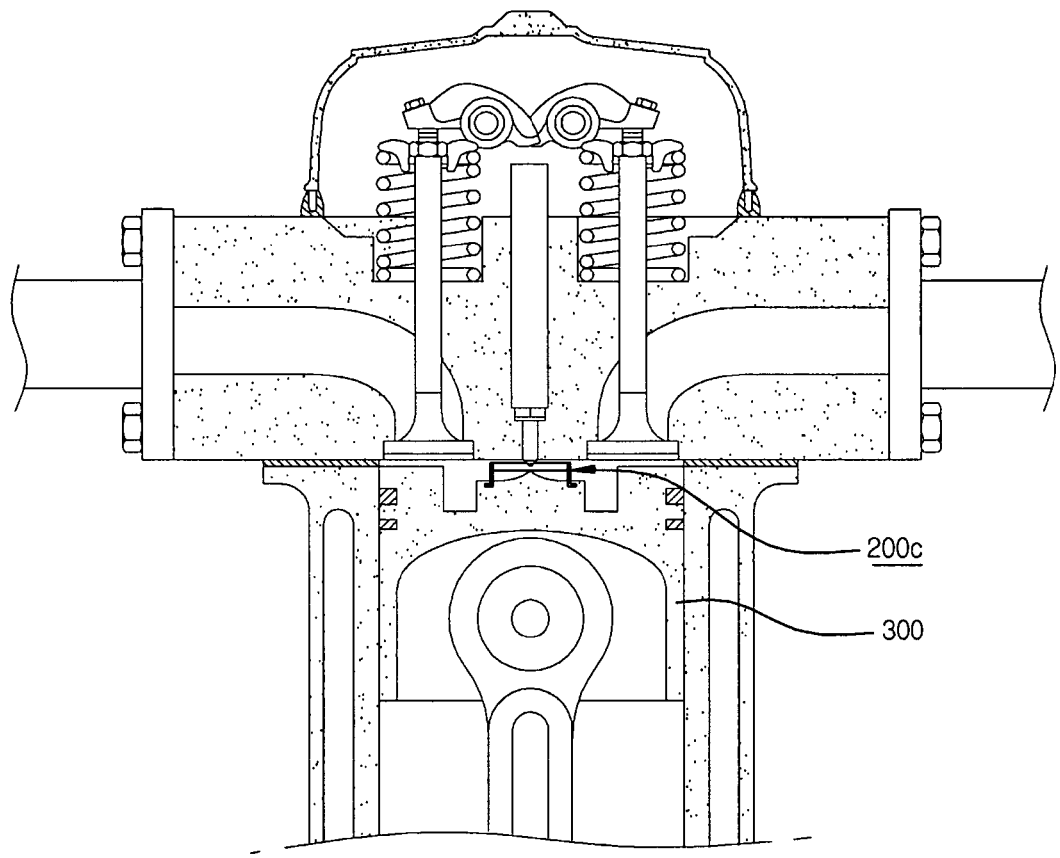
[FIG. 19]
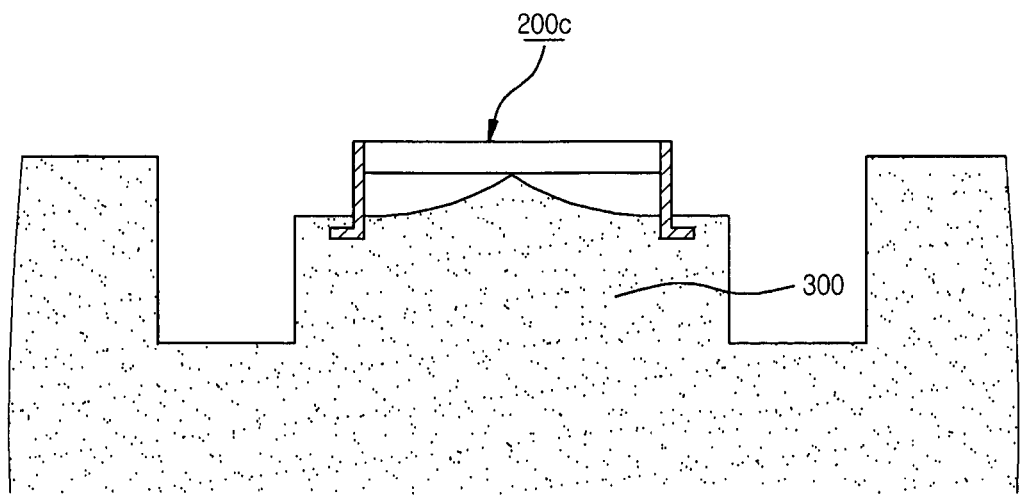

[FIG. 20]
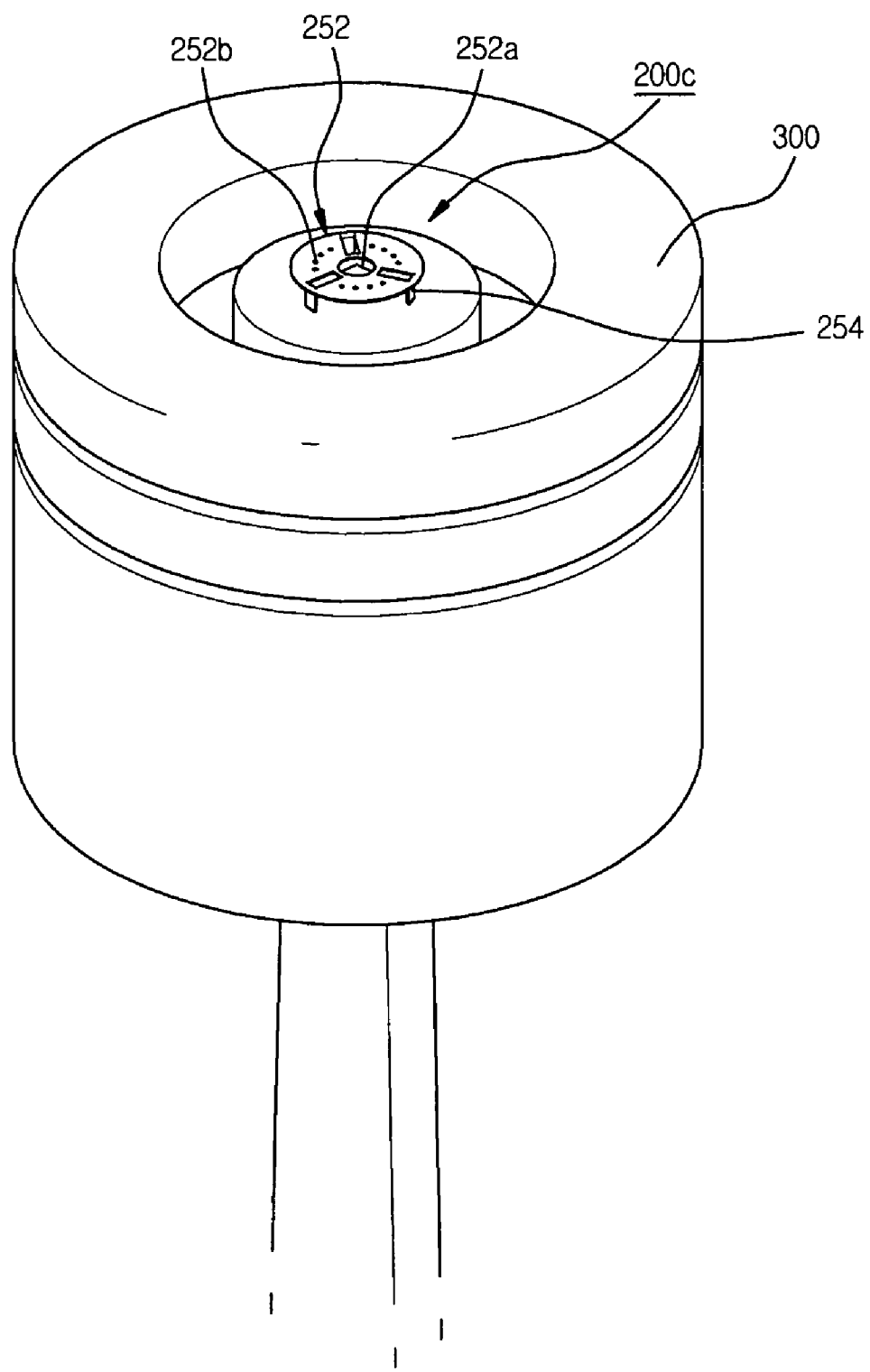

[FIG. 21]
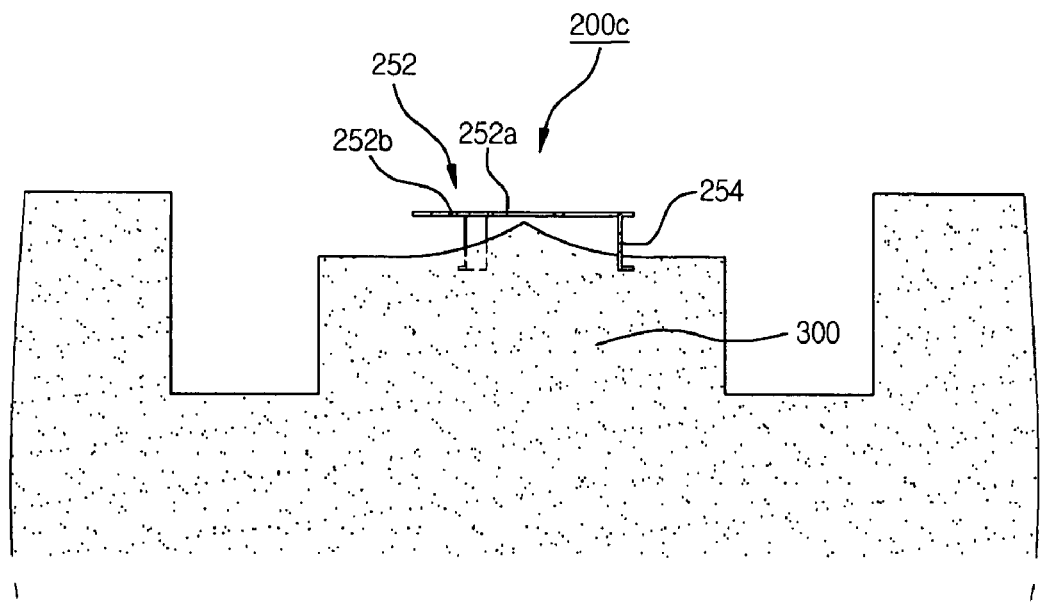
[FIG. 22]
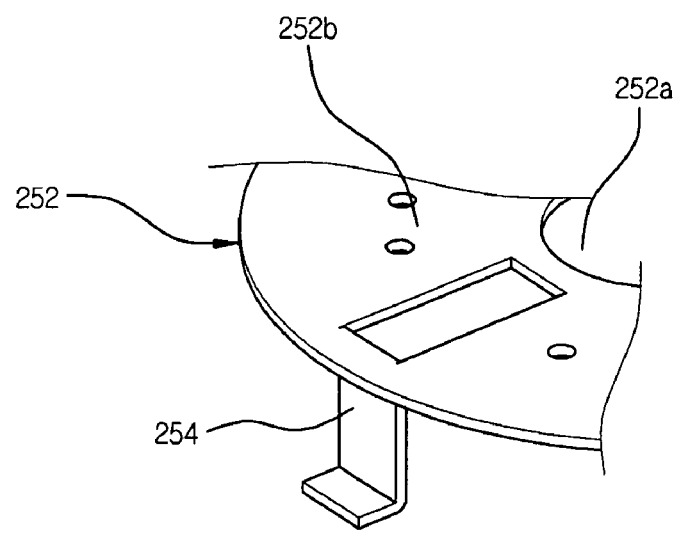

COMBUSTION PROMOTING DEVICE FOR INTERNAL COMBUSTION ENGINE

BACKGROUND OF THE INVENTION

1. Field of the Invention

The present invention relates generally to a combustion promoting device for an internal combustion engine, and more particularly, to a combustion promoting device for an internal combustion engine, in a combustion chamber of which a combustion promotion inductor made of a super alloy having excellent heat resistance and thermal conductivity is installed.

2. Description of the Prior Art

In general, an internal combustion engine is classified into a gasoline internal combustion engine and a diesel internal combustion engine according to a kind of fuel. First, it is a well-known fact in the gasoline internal combustion engine that a mixture (fuel and air) introduced through a valve mechanism is ignited by an ignition system, the ignited mixture is burnt and exploded to generate the explosive force, the explosive force converts the linear motion of a piston into the rotary motion of a crankshaft via a connecting rod, and thereby desired driving force is obtained. In this manner, in order to ignite and burn the mixture, the gasoline internal combustion engine is provided with an ignition plug. The ignition plug serves to apply a high-voltage current generated from an ignition coil to a center electrode, produce a spark from a gap between the center electrode and a ground electrode, and ignite and burn the mixture compressed in the combustion chamber. When the spark is produced, the ignition plug is exposed to high temperature (about 2000° C.) and high pressure (40 kgf/cm$^2$). Further, because the high voltage of 10000 V or more should be induced to the gap of the electrode section, the ignition plug should have excellent heat resistance, insulativity, and leak-proofness, as well as be stable chemically. Also, the electrode section should be always maintained at an appropriate temperature according to a rotation state of the engine.

A structure of a conventional ignition plug provided to this gasoline internal combustion engine is illustrated in FIG. 1.

As illustrated in FIG. 1, the conventional ignition plug 10 includes an electrode section, an insulator 16, a core 11, and a shell 18. Here, the electrode section is composed of a center electrode 1 provided at a leading end of the core 11, and a ground electrode 14 provided at a lower end of the shell 18 so as to have a predetermined gap from the center electrode 12. A spark is produced from the gap between the center electrode 12 and the ground electrode 12, and thereby burns a mixture in a combustion chamber. In this electrode section, the gap between the center electrode 12 and the ground electrode 12 is adjusted to have a range from 0.7 to 1.0 mm for battery ignition, and a range from 0.5 to 0.7 mm for magnet electric ignition.

Further, the insulator 16 is made of ceramic material, and acts as a path emitting a large quantity of heat generated from the electrode leading end to a cylinder head. As such, a length of the path is an important factor in deciding how much heat the ignition plug emits.

The shell 18 is composed of a portion for protecting the insulator 16, a lower thread portion (adjacent to the electrode section) fitted into a tapping hole of the cylinder head, and an upper planar portion for inserting a plug wrench, and is made of carbon steel.

When the ignition plug 10 constructed in this manner has been used for a long time, or is wetted by the inflow of an excessive mixture at the time of full throttle, the spark produced between the center electrode 12 and the ground electrode 14 is forced to have a narrow waveform range. For this reason, a quantity of incomplete combustion mixture increases, and thus a quantity of harmful gases emitted to the atmosphere increases. Eventually, the power of the engine is lowered.

Further, in the conventional ignition plug 10, because the center electrode 12 is vertically installed as illustrated in FIG. 1, a thermal surface friction region in the engine protrudes to cause a carbon deposit to be easily formed, which acts as an obstacle to the ignition. The ground electrode 14 is installed above the center electrode 12 in an L shape and protrudes to the center of the engine, so that it is responsible for malfunction giving rise to a small spark between the center electrode 12 and the ground electrode 14.

Thus, the conventional ignition plug 10 incurs reduction of the power of a vehicle which is caused by incomplete combustion of the fuel, increase of exhaust gases, excessive consumption of the fuel, and increase of noise, reduction of the lifetime of the internal combustion engine which is caused by adherence of carbon to the combustion chamber, lowering of the duration of peripheral components, and the like.

Meanwhile, it is generalized technology in the diesel internal combustion engine that air is drawn into the cylinder of a diesel internal combustion engine in a valve mechanism, the drawn air is compressed into high-temperature high-pressure air, the high-temperature high-pressure air is mixed with fuel injected through a nozzle or injector, the injected fuel is spontaneously ignited, burnt and exploded to produce explosive force, the explosive force gives rise to a rotary motion of a crankshaft, and thereby necessary rotational force is obtained.

This diesel internal combustion engine is provided with a glow plug as a pre-heating means for securing a smooth starting characteristic. The glow plug is installed around the nozzle or injector at an upper portion of the combustion chamber. However, the glow plug merely serves to pre-heat the inside of the combustion chamber, but it fails to improve combustion efficiency of the fuel.

SUMMARY OF THE INVENTION

Accordingly, the present invention has been made to solve these various problems occurring in the prior art, and an objective of the present invention is to provide a combustion promoting device for an internal combustion engine, capable of improving the noise level by minimizing noise, enhancing power and fuel efficiency, and reducing harmful gases such as carbon monoxide (CO), hydrocarbon (HC) and nitrogen oxide (NOx) to prevent environmental pollution.

According to an aspect of the present invention, there is provided a combustion promoting device for an internal combustion engine. The combustion promoting device includes an ignition plug for igniting an air-fuel mixture introduced into a combustion chamber of the internal combustion engine, an electrode section provided with a ground electrode that are made of iridium (Ir) and are formed at a region protruding from one side of an upper end of the ignition plug, and a center electrode that is formed to be inclined from the center of the ignition plug toward the ground electrode so as to have a predetermined gap from the ground electrode, and for generating a spark, and a combustion promotion inductor including a horizontal section that is installed on one end of the ignition plug so as to be adjacent to the electrode section and is spaced apart from the electrode section by a predetermined interval, and a vertical section that is bent from the horizontal section and fixed to one end of the ignition plug, and made of a super alloy having excellent heat resistance and thermal conductivity.

Here, the combustion promotion inductor may include a pre-heating barrier of a triangular shape at the vertical section so that pre-heated heat is not absorbed by the ignition plug.

Further, the combustion promotion inductor may include a pre-heating promoter elongatedly formed at the horizontal section in a lengthwise direction so as to be able to be pre-heated at the same time as the ignition of the ignition plug and in proportion to a quantity of the fuel gradually introduced into the combustion chamber of the internal combustion engine.

The center electrode may be installed at a slant angle ranging from 60° to 80°.

The super alloy may be any one selected from alloys consisting of nickel steel, chrome steel, nickel-chrome steel, platinum steel, iridium steel, and osmium steel.

According to another aspect of the present invention, there is provided a combustion promoting device for an internal combustion engine, which includes an ignition plug for igniting an air-fuel mixture introduced into a combustion chamber of the internal combustion engine, an electrode section provided with a horizontal rod that is installed perpendicular to a central axis of the ignition plug and protrudes horizontally from an upper end of the ignition plug, and two ground electrodes that are made of iridium (Ir), and are formed at regions protruding from opposite sides of an upper end of the ignition plug so as to be able to maintain a predetermined gap from each of the opposite ends of the horizontal rod, and for generating a spark, and a combustion promotion inductor including a horizontal section that is installed on one end of the ignition plug so as to be adjacent to the electrode section and is spaced apart from the electrode section by a predetermined interval, and a vertical section that is bent from the horizontal section and fixed to one end of the ignition plug, and made of a super alloy having excellent heat resistance and thermal conductivity.

According to yet another aspect of the present invention, there is provided a combustion promoting device for an internal combustion engine, which includes a glow plug for igniting an air-fuel mixture introduced into a combustion chamber of the internal combustion engine, and a combustion promotion inductor formed of a super alloy having excellent heat resistance and thermal conductivity, and including a body which is installed to extend to a leading end of the glow plug and has a shape of a cylinder of which one side is closed, and of which an outer circumferential surface is formed with a plurality of fine holes, and a support bar formed in the body.

According to yet another aspect of the present invention, there is provided a combustion promoting device for an internal combustion engine, which includes a nozzle for introducing fuel into a combustion chamber of the internal combustion engine, and a combustion promotion inductor formed of a super alloy having excellent heat resistance and thermal conductivity, and including a body which has the shape of a ring, is installed at a leading end of the nozzle at a predetermined interval, and is connected by a support.

According to yet another aspect of the present invention, there is provided a combustion promoting device for an internal combustion engine, which includes an injector for injecting fuel into a combustion chamber of the internal combustion engine, and a combustion promotion inductor formed of a super alloy having excellent heat resistance and thermal conductivity, and including a body which has the shape of a disk and is installed at a leading end of the injector, and a recess formed on an outer surface of the body.

According to yet another aspect of the present invention, there is provided a combustion promoting device for an internal combustion engine, which includes a piston for compressing an air-fuel mixture introduced into a combustion chamber of the internal combustion engine, and a combustion promotion inductor formed of a super alloy having excellent heat resistance and thermal conductivity, and including a body that is installed on a top surface of the piston so as to be spaced at a predetermined interval, and support legs that protrude downwardly from an outer circumferential surface of the body and are fixed on the top surface of the piston.

Here, the body may have the shape of a disk, on a surface of which fine holes are formed.

BRIEF DESCRIPTION OF THE DRAWINGS

The above and other objects, features and advantages of the present invention will be more apparent from the following detailed description taken in conjunction with the accompanying drawings, in which:

FIG. 1 is a perspective view illustrating a structure of a conventional ignition plug mounted to a gasoline internal combustion engine;

FIG. 2 is a perspective view illustrating a structure of an ignition plug mounted to a gasoline internal combustion engine in accordance with a first embodiment of the present invention;

FIG. 3 illustrates an important part of the ignition plug of FIG. 2;

FIG. 4 is a perspective view illustrating a first modification of the ignition plug of FIG. 2;

FIG. 5 is a perspective view illustrating a second modification of the ignition plug of FIG. 2;

FIG. 6 illustrates an important part of the ignition plug of FIG. 5;

FIG. 7 is a perspective view illustrating a glow plug mounted to a diesel internal combustion engine in accordance with a second embodiment of the present invention;

FIG. 8 is a cross-sectional view illustrating a structure of the glow plug of FIG. 7;

FIG. 9 is a magnified view of part A of FIG. 8;

FIG. 10 is a cross-sectional view taken along the line I-I of FIG. 9;

FIG. 11 illustrates an internal combustion engine having the glow plug of FIG. 7;

FIG. 12 illustrates a leading end of a nozzle supplying an air-fuel mixture in the internal combustion engine of FIG. 11;

FIG. 13 is a perspective view illustrating an injector mounted to a diesel internal combustion engine in accordance with a third embodiment of the present invention;

FIG. 14 is a cross-sectional view illustrating a structure of the injector of FIG. 13;

FIG. 15 is a magnified view of part B of FIG. 14;

FIG. 16 illustrates an internal combustion engine having the injector of FIG. 13;

FIG. 17 is a perspective view illustrating a piston mounted in an internal combustion engine in accordance with a fourth embodiment of the present invention;

FIG. 18 illustrates a state where the piston of FIG. 17 is mounted in an internal combustion engine;

FIG. 19 is a magnified cross-sectional view illustrating a construction of an important part of the piston of FIG. 17;

FIG. 20 is a perspective view illustrating a modification of a fourth embodiment of the present invention;

FIG. 21 is a magnified cross-sectional view illustrating a construction of an important part of the modification of FIG. 20; and FIG. 22 is a partial perspective view for explaining a construction of an important part of the modification of FIG. 20.

DETAILED DESCRIPTION OF THE PREFERRED EMBODIMENTS

Hereinafter, exemplary embodiment of the present invention will be described with reference to the accompanying drawings. In the following description and drawings, the same reference numerals are used to designate the same or similar components, and so repetition of the description on the same or similar components will be omitted.

FIG. 2 is a perspective view illustrating a structure of an ignition plug mounted to a gasoline internal combustion engine in accordance with a first embodiment of the present invention, and FIG. 3 illustrates an important part of the ignition plug of FIG. 2.

A reference numeral 100 indicates the ignition plug mounted to the gasoline internal combustion engine. The ignition plug 100 is installed in a combustion chamber of the gasoline internal combustion engine, and is directed to burn an air-fuel mixture in the combustion chamber. The ignition plug has a construction similar to an existing ignition plug. Hence, the same parts as the existing ignition plug will not be described, but only the features of the present invention will be described.

According to a first embodiment of the present invention, an electrode section 110 of the ignition plug 100 has a structure different from the existing ignition plug. Specifically, the electrode section 110 is provided with a ground electrode 114 that is formed at a region protruding from one side of an upper end of the ignition plug 100, and a center electrode 112 that is formed at a predetermined slant angle inclined from the center of the ignition plug 100 toward the ground electrode 114 so as to have a predetermined gap, and is supplied with high-voltage current discharged momentarily, thereby generating a spark.

The slant angle of the center electrode 112 may have any one of the angles ranging from 60° to 80°. The ground electrode 114 may be formed of iridium (Ir).

Further, the ground electrode 114 can minimize internal thermal friction to prevent a small spark thereof because it has a different direction and size, and particularly a very low height, compared to a conventional ground electrode. The ground electrode 114 is very reliable in duration and ignition performance because it has a small thermal surface upon which a carbon deposit may be formed, thereby serving to enhance power.

Hence, the ground electrode 114 of the present invention can prevent the generation of small sparks and carbon deposits, which hinder the ignition by lowering ignition performance, suffered in the prior art because the conventional ground electrode protrudes toward the inside of the cylinder in an L shape at a high height, increasing surface and thermal friction and causing weaker wear resistance, and so on.

Further, the center electrode 112 of the present invention is formed at a predetermined slant angle, so that carbon is detached from the carbon deposit formed on the surfaces of the center and ground electrodes 112 and 114 when combustion and explosion take place, and thereby it is possible to greatly improve the ignition performance.

Especially, the center electrode 112 is inclined from the center of the ignition plug 100 toward the ground electrode 114, thereby producing the spark in a constant direction. The center electrode 112 is formed from the center of the ignition plug 100 toward the ground electrode 114 at a low height, thereby minimizing a thermal friction region to prevent the small spark and carbon deposit from being generated.

According to effects that can be obtained by forming the center electrode 112 at a predetermined slant angle, the existing problems caused by the ground electrode 114 protruding toward the inside of the cylinder at a high height are improved upon to ensure a function of continuous ignition for a long period, so that the duration and wear resistance are greatly improved to enhance plug performance, and thereby stable ignition discharge can be obtained.

A reference numeral 200 indicates a combustion promotion inductor. The combustion promotion inductor 200 makes a feature of the present invention, and is comprised of a horizontal section 202 that is installed to be spaced apart from the electrode section 110 by a predetermined interval, and a vertical section 204 that is bent from the horizontal section 202 and coupled to one end of the ignition plug 100.

The combustion promotion inductor 200 is made of a super alloy having excellent heat resistance and thermal conductivity, and is installed around and above the electrode section 110 so as to be able to increase an intensity of the spark to reinforce explosive force concomitant with thermal expansion by absorbing high-temperature heat generated momentarily when an explosion stroke proceeds in the combustion chamber of the internal combustion engine and thus rapidly increasing temperature of the mixed gas introduced again after an exhaust stroke.

Further, the combustion promotion inductor 200 should be formed of a material having a long lifetime without changing physical properties at a high temperature (1200° C. or more) in the combustion chamber. Hence, the combustion promotion inductor 200 is preferably formed of a material that shows strong resistance to temperature of the ignition plug 100, thermal deformation, and wear, for instance any one selected from alloys consisting of a nickel (Ni) steel, a chrome (Cr) steel, a nickel-chrome steel, a platinum (Pt) steel, an iridium (Ir) steel, and an osmium (Os) steel.

The combustion promotion inductor 200 formed of this material serves to emit heat to an ambient air-fuel mixture while its temperature is rapidly raised by explosion started around a spark generation section and maintained for a constant time, thus having a heat island effect together with an exothermic function.

According to a first embodiment of the present invention, the surroundings of the combustion promotion inductor 200 are maintained at a temperature higher than the other portions at all times by the combustion promotion inductor 200. Hence, the air-fuel mixture around the spark generation section is always pre-heated at a temperature higher than constant temperature. Therefore, by pre-heating the air-fuel mixture around the electrode section of the ignition plug 100, i.e. around the spark generation section, at a predetermined temperature at all times to maintain the temperature higher than that of the other surroundings, the explosive force of the air-fuel mixture can be reinforced.

Further, because the combustion promotion inductor 200 is installed around and above both of the center electrode 112 and the ground electrode 114, it is pre-heated by the high temperature generated momentarily when the explosion stroke takes place, and the pre-heated inductor burns unburnt fuel of the introduced air-fuel mixture to maximize the combustion performance, so that high fuel efficiency and power can be obtained.

A reference numeral 210 indicates a pre-heating barrier. The pre-heating barrier 210 is formed on the vertical section 204 located at a position adjacent to one end of the ignition plug 100 so that the heat of the pre-heated combustion promotion inductor 200 is not absorbed by the ignition plug 100. This pre-heating barrier 210 is preferably formed as a triangular hole 212.

The pre-heating barrier 210 allows the pre-heated combustion promotion inductor 200 to have the limit within which the heat of the pre-heated combustion promotion inductor 200 is not absorbed by the ignition plug 100, thereby preventing a heat flow of the pre-heated combustion promotion inductor 200. As a result, the combustion promotion inductor 200 emits heat to the utmost extent, thereby having a function of accelerating the combustion as well as a function of maximizing the pre-heating.

FIG. 4 is a perspective view illustrating a first modification of the ignition plug of FIG. 2.

The first modification of FIG. 4 is different from the previous embodiment in that the combustion promotion inductor 200 as described above is additionally provided with a pre-heating promoter 220, and is identical to the previous embodiment with regard to the other configurations. More specifically, the same configurations are the electrode section 110 that is composed of the ground electrode 114 formed at the region protruding from one side of the upper end of the ignition plug 100, and the center electrode 112 inclined from the center of the ignition plug 100 toward the ground electrode 114, and the combustion promotion inductor 200 that is composed of the horizontal and vertical sections 202 and 204 installed around the electrode section 110, but the different configuration is that the combustion promotion inductor 200 as described above is additionally provided with the pre-heating promoter 220.

As shown, the pre-heating promoter 220 is preferably formed into an elongated hole 222 having a left-right symmetrical structure so as to be able to be pre-heated at the same time as the ignition of the ignition plug 100 and in proportion to a quantity of the fuel gradually introduced into the combustion chamber of the internal combustion engine. In other words, as the pre-heating promoter 220 is formed into the elongated hole 222 having the left-right symmetrical structure so as to allow the combustion promotion inductor 200 to be pre-heated at the same time as the ignition of the ignition plug 100 and in proportion to a quantity of the fuel gradually introduced into the combustion chamber of the internal combustion engine, the pre-heating promoter 220 reinforces fluidity of the combustion to burn unburnt remaining fuel. This complete combustion operation serves not only to improve the fuel efficiency but also to prevent incomplete combustion of the fuel.

FIG. 5 is a perspective view illustrating a second modification of the ignition plug of FIG. 2, and FIG. 6 illustrates an important part of the ignition plug of FIG. 5.

The second modification illustrated in FIGS. 5 and 6 has a difference in the configuration of the electrode section 110 mounted to the ignition plug 100 as described above, wherein the electrode section 110 includes the center electrode 112 having a horizontal rod 112a that is installed perpendicular to a central axis of the ignition plug 100 and protrudes outwardly from its upper end, and two ground electrodes 114a and 114b each installed to have a predetermined gap from each of the opposite ends of the horizontal rod 112a. The ground electrodes 114a and 114b are formed at regions protruding upwardly from diametrically opposite upper ends of the ignition plug 100. Further, the ignition plug 100 is provided with the combustion promotion inductor 200 as described above.

In the second modification, as the ground electrodes 114a and 114b constituting the electrode section 110 of the ignition plug 100 are disposed on both opposite sides of the center electrode 112, the spark is produced on both sides of the ignition plug 100, so that the ignition performance is improved. Further, the combustion performance is further improved by the combustion promotion inductor 200 of which the description has already been made above.

As in the second modification of the present invention, when the ground electrodes 114a and 114b are installed on both sides of the center electrode 112, the ignition takes place at two places when the engine is started, thereby improving the ignition performance. Further, high-temperature heat can be absorbed by a main body of the ignition plug through each of the ground electrodes 114a and 114b, and the small spark can be prevented.

According to the first embodiment and first and second modifications of the present invention as described above, both the structure where the combustion promotion inductor 200 is installed around the electrode section 110 of the ignition plug 100 and the structure where the center electrode 112 of the electrode section 110 is installed at a predetermined slant angle pre-heat the surroundings of the spark generation section of the ignition plug to completely burn the introduced air-fuel mixture, so that they can still further improve the ignition performance of the ignition plug at a given displacement, and thus obtain more improved combustion efficiency.

Accordingly, the present invention can accomplish the minimization of noise, the improvement of the smoothness and noise level of the engine, the improvement of power and fuel efficiency, and the environmental protection depending on the reduction of environmental factors, harmful exhaust gases, such as carbon monoxide (CO), hydrocarbon (HC) and nitrogen oxide (NOx), compared to the same displacement of the engine.

FIG. 7 is a perspective view illustrating a glow plug mounted to a diesel internal combustion engine in accordance with a second embodiment of the present invention, and FIG. 8 is a cross-sectional view illustrating a structure of the glow plug of FIG. 7. FIG. 9 is a magnified view of part A of FIG. 8, and FIG. 10 is a cross-sectional view taken along the line I-I of FIG. 9. FIG. 11 illustrates an internal combustion engine having the glow plug of FIG. 7, and FIG. 12 illustrates a leading end of a nozzle supplying an air-fuel mixture in the internal combustion engine of FIG. 11.

A reference numeral 100a indicates the glow plug mounted to the diesel internal combustion engine. The glow plug 100a is a pre-heating means that is installed in the combustion chamber of the internal combustion engine and is for securing a smooth starting characteristic. The inside of the combustion chamber is pre-heated by the glow plug 100a. This glow plug 100a is well known. In the second embodiment of the present invention, a combustion promotion inductor 200a extends from a leading end of the glow plug 100a.

The combustion promotion inductor 200a according to the second embodiment of the present invention is merely different in shape and identical in action and effects, compared to the combustion promotion inductor of the first embodiment as described above. Specifically, the combustion promotion inductor 200a according to the second embodiment of the present invention is formed of a super alloy having excellent heat resistance and thermal conductivity in the shape of a cylinder of which one side is closed, and is composed of a body 232 of which an outer circumferential surface is formed with a plurality of fine holes 234, and a support bar 236 formed in the body 232.

Further, such a combustion promotion inductor can be installed at the leading end of a nozzle 101 supplying an air-fuel mixture into the internal combustion engine illustrated in FIGS. 11 and 12, and particularly in a fuel injection port 101a with which the nozzle 101 is provided. In this manner, the combustion promotion inductor 201a installed at the leading end of the nozzle 101 is formed of a super alloy having excellent heat resistance and thermal conductivity, and includes a ring-like body that is formed at a predetermined interval and simultaneously connected by a support.

The combustion promotion inductor 200a or 201a according to the second embodiment has the same action and effects as that of the first embodiment. Specifically, the combustion promotion inductors 200a and 201a pre-heat the surroundings of the leading ends of the glow plug 100a and the nozzle 101 to completely burn the introduced air-fuel mixture, so that they can improve combustion efficiency at a given displacement.

Accordingly, the second embodiment of the present invention can also accomplish the minimization of noise, the improvement of the smoothness and noise level of the engine, the improvement of power and fuel efficiency, and environmental protection depending on the reduction of environmental factors, harmful exhaust gases, such as carbon monoxide (CO), hydrocarbon (HC) and nitrogen oxide (NOx), compared to the same displacement of the engine.

FIG. 13 is a perspective view illustrating an injector mounted to a diesel internal combustion engine in accordance with a third embodiment of the present invention, and FIG. 14 is a cross-sectional view illustrating a structure of the injector of FIG. 13. FIG. 15 is a magnified view of part B of FIG. 14, and FIG. 16 illustrates an internal combustion engine having the injector of FIG. 13.

A reference numeral 100b indicates the injector mounted to the diesel internal combustion engine. The injector 100b is installed in the combustion chamber of the internal combustion engine and is for injecting fuel. The fuel is injected into the combustion chamber by the injector 100b. This injector 100b is well known. In the third embodiment of the present invention, a combustion promotion inductor 200b is installed at a leading end of the injector 100b.

The combustion promotion inductor 200b according to the third embodiment of the present invention is merely different in shape and identical in action and effects, compared to the combustion promotion inductors of the embodiments as described above. Specifically, the combustion promotion inductor 200b according to the third embodiment of the present invention is installed at the leading end of the injector 100b, and includes a body 242 that is formed of a super alloy having excellent heat resistance and thermal conductivity in the shape of a disk and has a step 244 formed up and down on an outer circumferential surface thereof.

The combustion promotion inductor 200b according to the third embodiment has the same action and effects as those of the above-mentioned embodiments. Specifically, the combustion promotion inductors 200b pre-heats the surroundings of the leading end of the injector 100b to completely burn the introduced air-fuel mixture, so that it can improve combustion efficiency at a given displacement.

Accordingly, the third embodiment of the present invention can also accomplish the minimization of noise, the improvement of the smoothness and noise level of the engine, the improvement of power and fuel efficiency, and environmental protection depending on the reduction of environmental factors, harmful exhaust gases, such as carbon monoxide (CO), hydrocarbon (HC) and nitrogen oxide (NOx), compared to the same displacement of the engine.

FIG. 17 is a perspective view illustrating a piston mounted in an internal combustion engine in accordance with a fourth embodiment of the present invention. FIG. 18 illustrates a state where the piston of FIG. 17 is mounted in an internal combustion engine. FIG. 19 is a magnified cross-sectional view illustrating a construction of an important part of the piston of FIG. 17.

A reference numeral 300 indicates the piston mounted in the gasoline or diesel internal combustion engine. As well known, the piston 300 is for compressing an air-fuel mixture drawn into the combustion chamber of the internal combustion engine. In the fourth embodiment of the present invention, a combustion promotion inductor 200c is installed on a top surface of the piston 300.

The combustion promotion inductor 200c according to the fourth embodiment of the present invention is merely different in shape and installed position and identical in action and effects, compared to the combustion promotion inductors of the embodiments as described above. Specifically, the combustion promotion inductor 200c according to the fourth embodiment of the present invention is installed on the top surface of the piston 300.

The combustion promotion inductor 200c according to the fourth embodiment of the present invention includes a body 252 that is formed of a super alloy having excellent heat resistance and thermal conductivity in the shape of a ring, and support legs 254 that protrude downwardly from predetermined regions of the body 252 and are fixed on the top surface of the piston 300. In a method for fixing the combustion promotion inductor 200c on the top surface of the piston 300, as illustrated in FIG. 19, the combustion promotion inductor 200c is fixed on the top surface of the piston 300 in an integrally recessed form when the piston is fabricated.

FIG. 20 is a perspective view illustrating a modification of a fourth embodiment of the present invention. FIG. 21 is a magnified cross-sectional view illustrating a construction of an important part of the modification of FIG. 20. FIG. 22 is a partial perspective view for explaining a construction of an important part of the modification of FIG. 20.

As illustrated, the modification of the combustion promotion inductor 200c according to the fourth embodiment of the present invention is merely different in shape and installed position and identical in other configuration, compared to the combustion promotion inductor 200c of the fourth embodiment as described above. Specifically, the modified combustion promotion inductor 200c includes a body 252 that is formed of a super alloy having excellent heat resistance and thermal conductivity in the shape of a disk and is provided with a through hole 252a in its center and fine holes 252b on its surface, and support legs 254 that are bent downwardly from the body 252, and is installed on a top surface of the piston 300.

In order to bend each support leg 254 downwardly from the body 252, an intermediate part of the body 252 is cut out in a C shape and bent downwardly, as illustrated in FIG. 22.

In a method for fixing the modified combustion promotion inductor 200c on the top surface of the piston 300, as described above, the combustion promotion inductor 200c is fixed on the top surface of the piston 300 in an integrally recessed form when the piston is fabricated.

The combustion promotion inductor 200c according to the fourth embodiment and its modification has the same action and effects as those of the above-mentioned embodiments. Specifically, the combustion promotion inductors 200c always pre-heats the upper portion of the combustion chamber to completely burn the introduced air-fuel mixture, so that it can improve combustion efficiency at a given displacement.

Accordingly, the fourth embodiment of the present invention can also accomplish the minimization of noise, the improvement of the smoothness and noise level of the engine, the improvement of power and fuel efficiency, and environmental protection depending on the reduction of environmental factors, harmful exhaust gases, such as carbon monoxide (CO), hydrocarbon (HC) and nitrogen oxide (NOx), compared to the same displacement of the engine.

Further, the above-mentioned various embodiments of the present invention can be applied to internal combustion engines for liquefied petroleum gas (LPG), internal combustion engines for large-sized shipping, thermoelectric power plants, two cycle internal combustion engines, and the like, so that power is highly improved, and discharge of harmful substances from the exhaust gases is considerably reduced. Further, an environmental characteristic reducing air pollution and combustion efficiency increase to improve the fuel efficiency, so that it is possible to obtain economical gains such as energy conservation and extension of a vehicle's lifetime.

As can be seen from the foregoing, according to the present invention, the pre-heated state is always sustained by absorbing high-temperature heat generated momentarily when the explosion stroke of the internal combustion engine, and then the heat radiates to the surroundings to help the combustion, so that it is possible not only to minimize the noise to improve the noise level but also improve power and fuel efficiency. Further, the harmful exhaust gases, such as carbon monoxide (CO), hydrocarbon (HC) and nitrogen oxide (NOx) can be reduced to prevent environmental pollution.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A combustion promoting device for an internal combustion engine, comprising:
    an ignition plug for igniting an air-fuel mixture introduced into a combustion chamber of the internal combustion engine;
    an electrode section provided with a ground electrode that is made of iridium (Ir) and is formed at a region protruding from one side of an upper end of the ignition plug, and a center electrode that is formed to be inclined from the center of the ignition plug toward the ground electrode so as to have a predetermined gap from the ground electrode, and for generating a spark; and
    a combustion promotion inductor including a horizontal section that is installed on one end of the ignition plug so as to be adjacent to the electrode section and is spaced apart from the electrode section by a predetermined interval, and a vertical section that is bent from the horizontal section and fixed to one end of the ignition plug, and made of a super alloy having excellent heat resistance and thermal conductivity.

2. The combustion promoting device as claimed in claim 1, wherein the combustion promotion inductor includes a pre-heating barrier of a triangular shape at the vertical section so that pre-heated heat is not absorbed by the ignition plug.

3. The combustion promoting device as claimed in claim 1, wherein the combustion promotion inductor includes a pre-heating promoter elongatedly formed at the horizontal section in a lengthwise direction so as to be able to be pre-heated at the same time as the ignition of the ignition plug and in proportion to a quantity of the fuel gradually introduced into the combustion chamber of the internal combustion engine.

4. The combustion promoting device as claimed in claim 1, wherein the center electrode is installed at a slant angle ranging from 60° to 80°.

5. The combustion promoting device as claimed in claim 1, wherein the super alloy is any one selected from alloys consisting of a nickel steel, a chrome steel, a nickel-chrome steel, a platinum steel, an iridium steel, and an osmium steel.

6. A combustion promoting device for an internal combustion engine, comprising:
    an ignition plug for igniting an air-fuel mixture introduced into a combustion chamber of the internal combustion engine;
    an electrode section provided with a horizontal rod that is installed perpendicular to a central axis of the ignition plug and protrudes horizontally from an upper end of the ignition plug, and two ground electrodes that are made of iridium (Ir), and are formed at regions protruding from opposite sides of an upper end of the ignition plug so as to be able to maintain a predetermined gap from each of the opposite ends of the horizontal rod, and for generating a spark; and
    a combustion promotion inductor including a horizontal section that is installed on one end of the ignition plug so as to be adjacent to the electrode section and is spaced apart from the electrode section by a predetermined interval, and a vertical section that is bent from the horizontal section and fixed to one end of the ignition plug, and made of a super alloy having excellent heat resistance and thermal conductivity.

* * * * *